United States Patent

Yamaguchi et al.

[15] 3,701,095

[45] Oct. 24, 1972

[54] VISUAL FEATURE EXTRACTION SYSTEM FOR CHARACTERS AND PATTERNS

[72] Inventors: Yukiya Yamaguchi, Yokohama; Kunihiko Fukushima, Tokyo; Minoru Yasuda, Tokyo; Shojiro Nagata, Tokyo, all of Japan

[73] Assignee: Nippon Hoso Kyokai, Tokyo, Japan

[22] Filed: Sept. 14, 1970

[21] Appl. No.: 71,659

[30] Foreign Application Priority Data

May 25, 1970 Japan ......................44/44014

[52] U.S. Cl.......................340/146.3 MA, 340/172.5
[51] Int. Cl...............................................G06k 9/12
[58] Field of Search.........................340/146.3, 172.5

[56] References Cited

UNITED STATES PATENTS 3,496,382 2/1970 Hendrix..................340/172.5

*Primary Examiner*—Maynard R. Wilbur
*Assistant Examiner*—William W. Cochran
*Attorney*—Stevens, Davis, Miller & Mosher

[57] ABSTRACT

A visual feature extraction system comprising electric circuit models having a similar construction with the visual system of higher animals. The system comprises analog threshold elements as the corresponding elements to visual neuron cells. An analog threshold element is composed in a manner that to each of a plurality of its inputs an interconnecting coefficient is allocated respectively and if an algebraic sum of all of the inputs is positive, a weighted sum of the inputs is derived as the output, and if the algebraic sum is negative, the output becomes zero.

The system is composed by such elements connected to form multilayered parallel network, wherein each layer recognizes one of features such as, contrast, dot, line component of simple type, line component of complex type, end of line, curved portion and curvature, and the layers are interconnected with a predetermined interconnecting characteristics between each other so as to detect the linear portion, the curved portion, etc. of an input pattern.

4 Claims, 28 Drawing Figures

VISUAL FEATURE EXTRACTION SYSTEM FOR CHARACTERS AND PATTERNS

BACKGROUND OF THE INVENTION

The present invention relates to a visual feature extraction system for character and pattern recognition.

The technique of pattern recognition for recognizing characters and patterns by extracting visual features of the characters and the patterns has become more and more attractive according to the recent development of the social background for the necessity of information treatment. For instance, if such character recognition by a non-manual means is realized, handwritten or printed data may directly and conveniently be read-in by an electronic computer and thus it may become possible to eliminate manual working such as to convert the data into the punched cards or into the punched tapes.

In order to realize such automatic character recognition system it is necessary at first to realize a system to extract features of such characters and patterns. However, no practical system had been developed or proposed so far.

SUMMARY OF THE INVENTION

The present invention relates to an electronic visual feature extraction system for characters and patterns, which can constitute a primary constructive element of the pattern recognization system. The system of the present invention is realized basically by our research for biological systems, especially, by the research for the visual systems of higher animals.

The present invention relates to such a visual feature extraction system and the composing network of such system using electric circuits having equivalent functions with the composing element of such visual systems of higher animals.

For the pattern recognition of a written information, it is necessary at first to extract various features of a pattern or a figure, for instance such features as; end of line, curvature, dot, cross point of a line component constructing the pattern and the relative positional relation of the above features.

In order to realize the above object, it is quite useful to investigate visual feature extraction function and the mechanism of animals and to apply the knowledge of such investigation to the system of the present invention. The reason the the above may be presented as follows. The characters and the patterns used by human beings should have been so constructed as being easily recognized by visual observation of the human being. Therefore, the objective recognization system need not be constructed to distinguish features, which are difficult to be distinguished by the feature extraction function of a living body or an animal. On the contrary, from different features, which are clearly distinguished by the visual system of a living body for the difference, should be extracted the characteristic feature by the recognization device in order to clearly distinguish such difference.

According to physiological experiments for the visual neuron system of a living body, it has been found that the neuron cells are interconnected with each other to form a multilayer construction. Also it is known that neurons in a layer located in a position closer to an input of the visual system of the living body, namely close to the retina, can only respond with comparatively simpler patterns of the figure projected onto the retina and that another type of neurons may exist on the layers at a deeper position and according to the depth of the layer there will appear neurons, which can respond to more complicated patterns, such as a line in particular direction or an end of a line.

Particularly in the research field for the recognition of curvilinear patterns, very little neurophysiological date has been disclosed so far. However, judging from many of psychological experiments and results of measurement of the distribution of eye line with an eye-marker camera, it is presumed that an attention of eye line of a human being mainly concentrate to the portion having the largest curvature on a curvilinear figure. Therefore, it can be considered that the curvature of an input pattern is an important feature in character recognition.

The present invention has been obtained mainly by the above consideration and has for its object to realize a novel system able to extract the features of characters and patterns in a similar manner with the visual function of a living body, wherein a plurality of non-linear type analog threshold elements are used as the corresponding elements of visual neurons of a living body and by realizing a multilayered parallel interconnecting network of the elements.

Further object of the present invention is to realize a novel visual feature extraction system for curvilinear portion of a line and the curvature. This is based on a consideration of the fact that the curvature of the input pattern is an important feature of the character and pattern recognization as proved by various physiological experiments and results of eye line distribution test by eye-marker camera.

A still further object of the invention is to realize a novel electronic interconnecting circuit arrangement for offering a detecting measure for curved line and curvature. The circuit arrangement comprising photoreceptor means for detecting characters and patterns, means for detecting contrast of the pattern, means for detecting line component and also interconnecting means of the multilayered parallel networks.

In order to realize the above mentioned objects, the system of the present invention comprises at least a photoreceptor layer, a contrast detecting layer, a line component detecting layer, a curved pattern detecting layer and a curvature detection layer.

The photoreceptor of the system of the present invention may comprise a two-dimensional array of a plurality of photo-responsive elements, such as photoelectric converting elements.

The contrast detecting layer of the present invention may comprise a two-dimensional array of a plurality of non-linear analog threshold elements interconnected in cascade with the photoreceptor layer.

The line component detecting layer comprises a plurality of layers each having the same construction as that of the contrast detecting layer. If the surface of each layer is expressed by two orthogonal axes $\xi$ and $\eta$, the successive layers are interconnected parallel to the contrast detecting layer with their axes being successively equiangularly deviated about their center of the axes.

The curved portion detecting layer also consists of a plurality of layers each having the same construction as that of the contrast detecting layer and each layer is interconnected in cascade with the line component detecting layer.

The last curvature detecting layer is a layer having the same construction as that of the contrast detecting layer and is so interconnected as to receive input signals in parallel from each of the layers of the curved portion detecting layer.

The individual non-linear analog threshold element in each of the above detecting layers is constructed so as to receive signals via an interconnecting coefficient circuit having its characteristics responsive to the purpose of detection from a group of the elements in a certain region or an accepting region of the preceding layer, and to produce an output having an excess value from a predetermined threshold value corresponding to the algebraic sum of the receiving signal only when the algebraic sum of the signals is positive.

The receptive regions of individual non-linear analog threshold elements of the above contrast detecting layer, the line component detecting layer and the curvature detecting layer are so arranged as to overlap with each other and with respect to the photoreceiving surface of the photoreceptor layer and to cover the whole photo-receiving surface.

The receptive fields of the individual non-linear analog threshold element of the curved portion detecting layer are so arranged as to receive input signals from two or three adjacent regions located along the direction of the line component detected by the preceding line component detecting layer and are arranged to be interconnected to each of these regions antagonistically.

The construction of the layers and the characteristics of the interconnecting coefficient circuits will more clearly be described with respect to the embodiments of the present invention by referring to the accompanied drawings.

DETAILED EXPLANATION OF THE INVENTION

Figure 1:
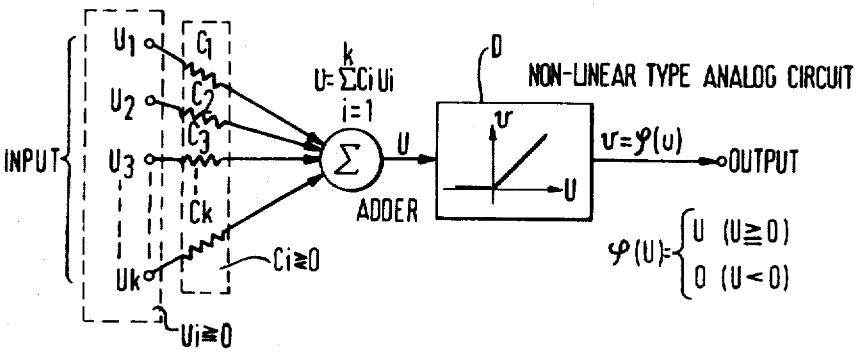
FIG. 1 is a schematical block diagram showing a typical construction of a non-linear analog threshold element forming an elemental part of a detection layer of the system according to the present invention.

FIG. 1 shows an embodiment of a non-linear analog threshold element usable in the visual feature extraction system according to the present invention. This element is an abstracted model of a neuron system of a living body and has a large number of inputs and a single output. The input and output signals take a non-negative analog value, namely the value is either positive or zero, and for example, of an electric voltage. Each input terminal $u_i$ ($i = 1, 2, \ldots k$) is connected to a summing circuit Σ through an interconnecting circuit $C_i$ ($i = 1, 2, \ldots k$) having a predetermined positive or negative interconnecting coefficient. Thus, an output signal $u$ of the summing circuit Σ is obtained as a weighted algebraic sum of the input signals $u_1, u_2, \ldots u_k$ and the interconnecting coefficients $C_1, C_2 \ldots C_k$, and may be expressed as follows;

$$u = u_1 \cdot C_1 + u_2 \cdot C_2 + \ldots + u_k \cdot C_k \quad (1)$$

To the output terminal of the summing circuit Σ, there is connected a non-linear analog circuit D having such an analog characteristic that when the weighted algebraic sum $u$ is positive, it supplies this positive value and when the weighted algebraic sum $u$ is negative, it supplies an output of zero. Thus, an output $v = \phi(u)$ of the nonlinear analog circuit $D$ may be represented as follows;

$$v = \phi(u) = \begin{cases} u & (u \geqq 0) \\ 0 & (u < 0) \end{cases} \quad (2)$$

That is, the output $v$ of the non-linear analog threshold element can be generally represented by the following equation;

$$v = \phi\left\{\sum_{i=1}^{k} C_i \cdot \mu_i\right\} \quad (3)$$

The interconnecting coefficient $C_l$ of the interconnecting circuit connected to each input terminal corresponds to the intensity of an interconnection between neurons, that is the intensity of a synapse of a living body. An input terminal having a positive interconnecting coefficient corresponds to an excitatory synapse and an input terminal having a negative interconnecting coefficient corresponds to an inhibitory synapse. In a system according to the present invention, a layer consisting of a number of such non-linear analog threshold elements being arranged two-dimensionally, is used as a unit layer.

Figure 2:
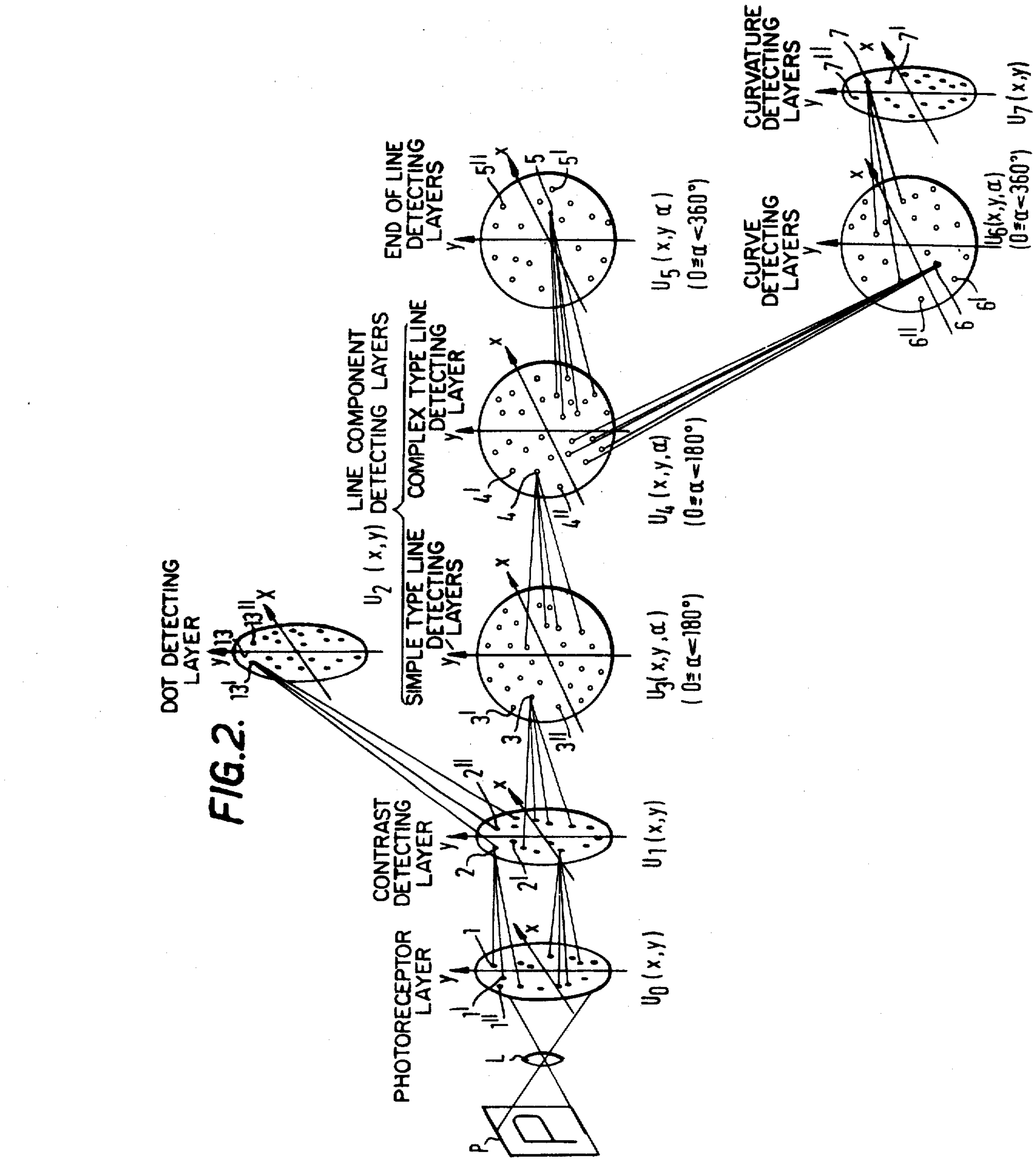
FIG. 2 is a schematic diagram showing a basic pattern of the system according to the present invention.

FIG. 2 shown diagrammatically an example of the structure of the visual feature extraction system according to the present invention. In FIG., 2, layers except for a layer $U_o$ depicted by an ellipse represent layers consisting of a two-dimensional array of a number of non-linear analog threshold elements and layers depicted by a circle represent layers consisting of a plurality of unit layers each having a two-dimensional array of a large number of non-linear analog threshold elements. Thus, the latter layers illustrated by a circle may be considered as layers consisting a large number of non-linear analog threshold elements arranged three-dimensionally.

In FIG. 2, a reference character P denotes an input pattern features of which are to be extracted. An image of the input pattern P is projected on the photoreceptor layer $U_o$ by means of a suitable lens system L. This lens L corresponds to a lens of the eye system of a living body. The photoreceptor layer $U_o$ consists of a plurality of photoreceptor elements such as photoelectric converting elements 1, 1', 1'', . . . , arranged two-dimensionally on an $x$-$y$ plane and corresponds to the retina of the eye system of a living body. The remaining layers $U_1$, $U_2$, $U_3$ and $U_4$ are composed of a large number of non-linear analog threshold elements arranged two-dimensionally or three-dimensionally as described above. On a photoreceptive surface of the photoreceptor layer $U_o$, two-dimensional co-ordinates (x, y) are considered and an output signal produced by a photoreceptor element located at a point $(x, y)$ on said co-ordinates, is represented as $u_o(x, y)$.

The second layer $U_1$ is a contrast detecting layer and consists of a single unit layer having a number of non-linear analog threshold elements 2, 2', 2'', . . . arranged two-dimensionally. As in a case of the photoreceptor layer $U_o$, an output of a non-linear analog threshold element located at a point (x, y) on the two-dimensional co-ordinates (x, y) may be expressed as $u_1(x, y)$. Every element of the contrast detecting layer $U_1$ receives outputs from a set of photoelectric converting elements of the photoreceptor layer $U_o$ within a receptive field. The sum of the interconnecting coefficients for each of the elements of the layer $U_1$ has the same value. The receptive fields have overlapped portions of the photoreceptive surface. The magnitude of the sum of the interconnecting coefficients is represented as $C_{l}1 (\xi, \eta)$, where $\xi$ and $\eta$ are the arguments for denoting a position of an individual input terminal. Here, use is made of a symbol $S_1$ to represent a set of input terminals of a single element, that is a set of all points of $(\xi, \eta)$ for which $C_{l1}(\xi, \eta) \neq 0$ holds. By using such notations, an output $u_1(x, y)$ of an arbitrary element in the contrast detecting layer $U_1$ may be expressed as follows:

$$u_1(x,y)=\phi[\iint_{S_1} C_{l1}(\xi,\eta)\cdot U_o(x+\xi,y+\eta)d\xi,d\eta] \quad (4)$$

Figure 3A:
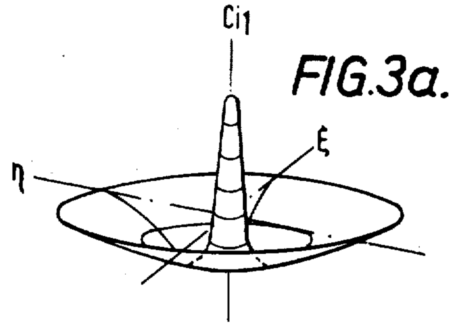
FIG. 3*a* is a perspective view showing a pattern of three-dimensional characteristics of the interconnecting coefficient of a contrast detecting layer.
Figure 3B:
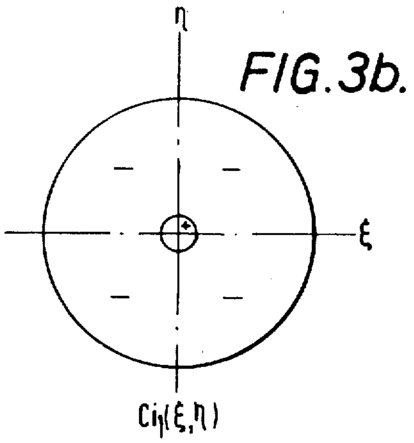
FIG. 3*b* is a plan view of a pattern of the three-dimensional characteristics shown in FIG. 3*a;*

Where, $\phi(u)$ is the non-linear function defined by the above equation (2). Strictly speaking, since a number of elements exist discretely and the arguments $x$, $y$, $\xi$, $\eta$ can take only integral values, the integration in the equation (4) must be replaced by the summation as in the equation (3). However, since the number of input terminals of a single element is sufficiently large and the elements are arranged very close to each other, the integration can be used instead of the summation for simplicity. In the contrast component detecting layer $U_1$, in order to detect contrast components even when the intensity of the background is changed, the elements 2, 2', 2'', . . . are connected in such a manner that an ON-CENTER type receptive field of the intensity $C_{l1}(\xi,\eta)$ of the interconnecting coefficient can be obtained as shown in FIGS. 3a and 3b. In FIG. 3a, a vertical axis $C_{l1}$ represents a magnitude of the interconnecting coefficient and its sign is zero on a plane formed by $\xi$, $\eta$ axes and becomes positive (excitatory input) above said plane and negative (inhibitory input) below said plane, respectively. With such a characteristic of the interconnecting coefficient, the contrast component of the input pattern can be detected as a contrast component at a position at which the element responding to such contrast component is located. That is, even when the intensity of the background is changed, an alternating current component of spacial frequency can be extracted. A projected pattern of such an interconnecting coefficient $C_l$ on a plane is illustrated in Fig. 3b. In FIG. 3b, a sign + denotes an interconnecting coefficient having a positive polarity and a sign − an interconnecting coefficient having a negative polarity. A region surrounded by an outer circle is a receptive field which is represented as $S_1$ in the equation (4). When it is desired to process a pattern extraction with black lines on a white background, then all that is necessary is to exchange the signs of the interconnecting coefficients $C_{l1}(\xi, \eta)$.

Figures 3C, 4A:
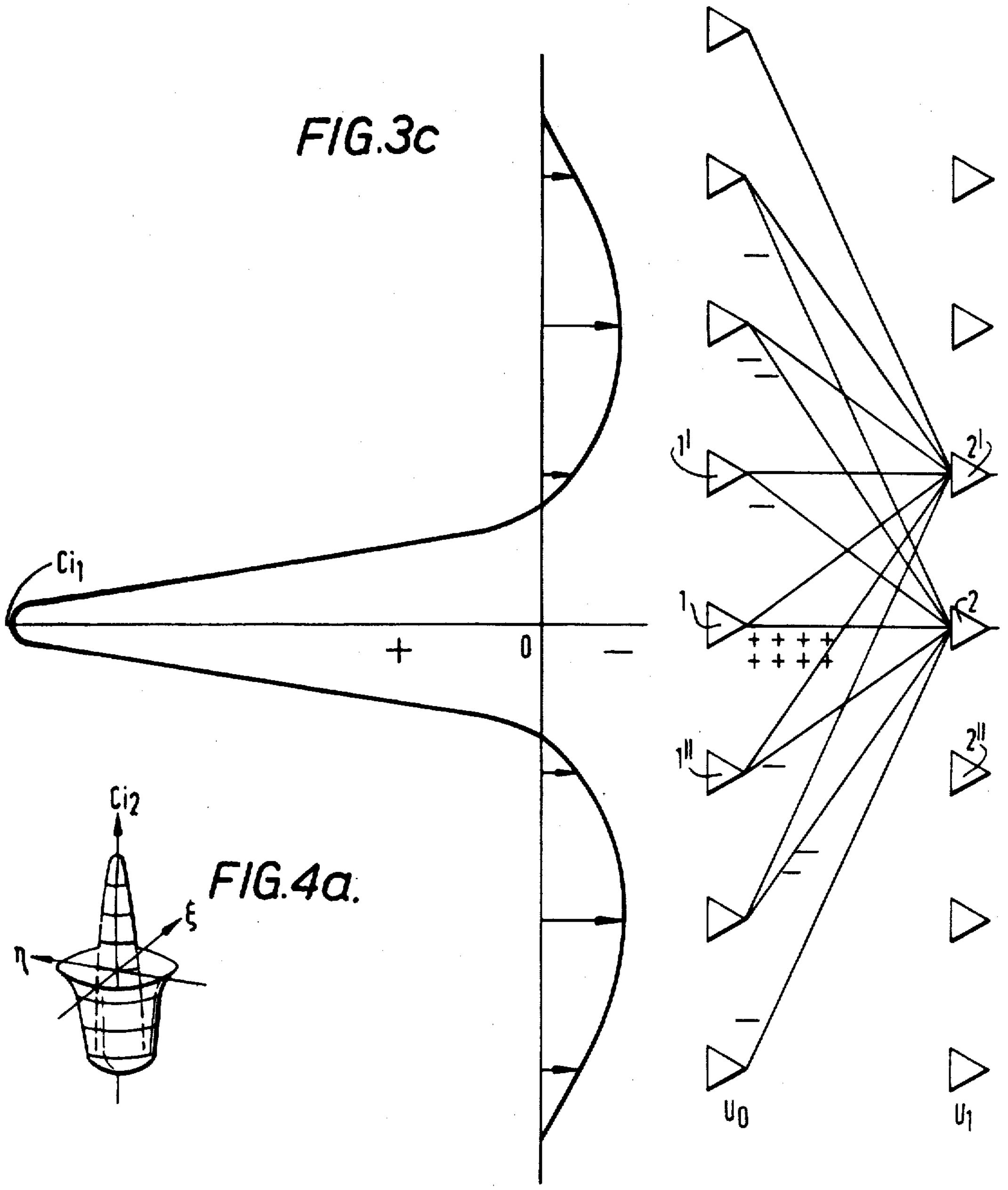
FIG. 3*c* is a diagram for explaining the characteristic pattern shown in FIGS. 3*a* and 3*b;*
FIGS. 4*a* and 4*b* are diagrams showing a pattern of characteristics of interconnecting coefficient of a dot detecting layer.

FIG. 3c shows diagrammatically the condition of the interconnection between the photoreceptor layer $U_o$ and the contrast component detecting layer $U_1$. The number of the signs + and − attached to conductors represents the intensity of the interconnection. The element 2 of the layer $U_1$ receives outputs from the photoreceptor elements within the receptive field which are opposed to the related element 2 of the layer $U_1$ as the strongest excitatory inputs. The interconnection becomes weak to the photoreceptor elements which locate apart from the photoreceptor element opposed to the element 2. From the photoreceptor elements which locate further apart from said photoreceptor element, the element 2 receives signals as inhibitory inputs. Outputs from the photoreceptor elements of the photoreceptor layer $U_o$ which are not coupled to the element 2 do not exert any influence on the related element 2, but they exert an excitatory and/or inhibitory influence on other elements 2', 2'', . . . .

Figure 4B:
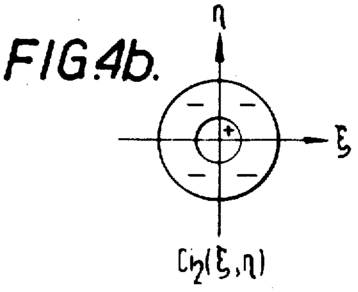

The dot detecting layer $U_2$ consists of a unit layer having a two-dimensional array of non-linear analog threshold elements. Elements 13,13', 13'', . . . of the dot component detecting layer $U_2$ and the element 2, 2', 2''. . . of the contrast component detecting layer $U_1$ within the corresponding receptive fields are interconnected with such an interconnecting coefficient $C_{l1}(\xi,\eta)$ as shown in FIGS. 4a and 4b.

The diameter of a positive region of the interconnecting coefficient $C_{12}$, that is a region of an excitatory input, is preferably so determined that it substantially corresponds to a size of a dot given as an input pattern to be detected. The width of a negative region, that is a region of inhibitory input, is determined by such a condition that a dot which is separated from a line component or another dot to that extent, should be recognized as an independent dot. An output of the dot detecting layer $U_2$ canbe expressed as follows;

$$u_2(x,y)=\phi[\iint_{S_2} C_{12}(\xi,\eta)\cdot U_1(x+\xi,y+\eta)d\xi,d\eta] \quad (5)$$

Where, $S_2$ represents a set of input terminals, that is an area of a number of elements of the layer $U_1$ which are all connected to a single common element of the layer $U_2$.

In the embodiment shown in FIG. 2, a line component detecting layer consists of two unit layers $U_3$ and $U_4$. The later $U_3$ is a layer for detecting simple line components and consists of a number of layers connected in parallel with the contrast detecting layer $U_1$ with different orientations of the interconnection in order to detect line components of different orientations. Each of the layers $U_3$ has a two-dimensional array of a large number of non-linear analog threshold elements. An interconnecting coefficient $C_{13}$ of a non-linear analog threshold elements in each layer $U_3$ is graphically shown in FIGS. 5*a* and 5*b*. With such an interconnecting coefficient $C_{13}$, line components of orientation $\alpha$ can be detected. In order to detect line components of all directions, a relative angle $\alpha$ between the orthogonal co-ordinate axes of each layer must be set to satisfy such a condition as $0° \leq \alpha < 180°$. In this structure, a position of an element can be expressed by three-dimensional co-ordinates $(x, y, \alpha)$. An element positioned at a point $(x, y, \alpha)$ responds most strongly to a line component passing through a point $(x, y)$ and having an orientation of $\alpha$ and an output from the element gradually decreases when an orientation of line deviates from the direction of $\alpha$. An output $u_3(x, y, \alpha)$ of an arbitrary element of the layer $U_3$ can be represented as follows;

$$u_3(x,y,\alpha)=\phi\{\iint_{S_3} C_{13}(\xi,\eta,\alpha)\cdot U_1(x+\xi,y+\eta)d\xi,d\eta\} \quad (6)$$

The layer $U_4$ consists of a plurality of unit layers each of which corresponds to the unit layer consisting the layer $U_3$. Each unit layer of $U_4$ is interconnected to each unit layer of $U_3$ in a cascade mode and detects complex line component. Each non-linear analog threshold element produces an output which equals to a sum of outputs $u_3(x, y, \alpha)$ of the elements of the layer $U_3$ along a line perpendicular to an orientation $\alpha$ and passing through a point $(x, y)$. As explained above, the element of the line component detecting layer $U_3$ at a point $(x, y, \alpha)$ only responds to a line component passing through a point $(x, y)$ and having an orientation of $\alpha$, but does not respond when the line shifts in parallel with a line perpendicular to the direction $\alpha$ to vary its position. On the contrary, the elements 4, 4′, 4″, . . . of the layer $U_4$ can respond even when a position of a line component of an input pattern varies as long as it is in a given region, i.e., within a receptive field. Thus, the interconnecting coefficient $C_{14}$ and the region of the interconnection can be shown as FIGS. 6*a* and 6*b*. An output $u_4(x, y, \alpha)$ can also be expressed by the three-dimensional co-ordinates and may be written as follows;

$$u_4(x,y,\alpha)=\phi\{\iint_{S_4} C_{14}(x,y,\alpha)\cdot U_3(x+\xi,y+\eta)d\xi,d\eta\} \quad (7)$$

Figures 5A, 5B, 6A, 6B, 7A:
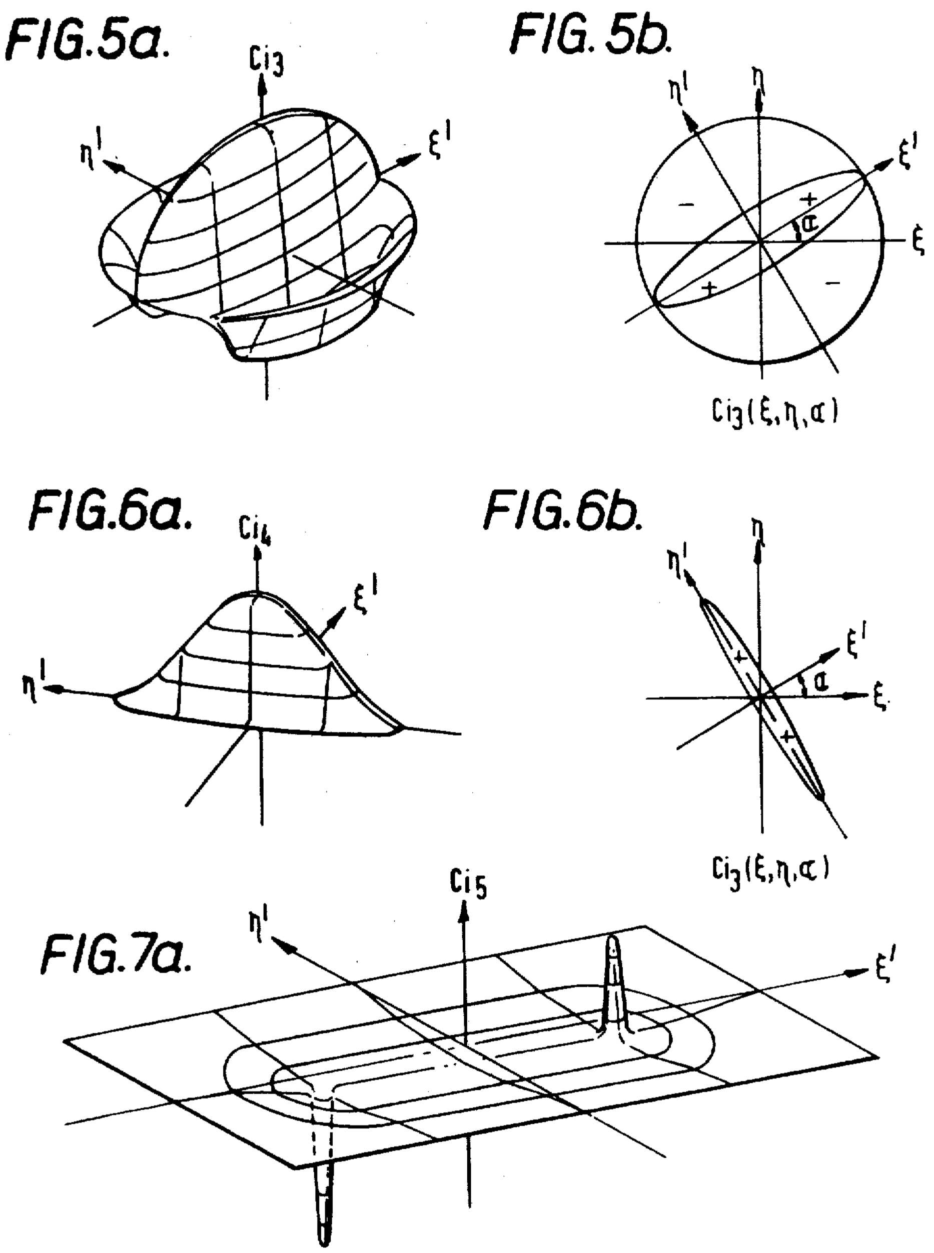
FIGS. 5*a* and 5*b* are diagrams showing a pattern of characteristics of interconnecting coefficient of a line component detecting layer of simple type.
FIGS. 6*a* and 6*b* are diagrams showing a pattern of characteristics of interconnecting coefficient of a line component detecting layer of complex type.
FIGS. 7*a* and 7*b* are diagrams showing a pattern of interconnecting coefficient of an end of line detecting layer.
Figure 7B:
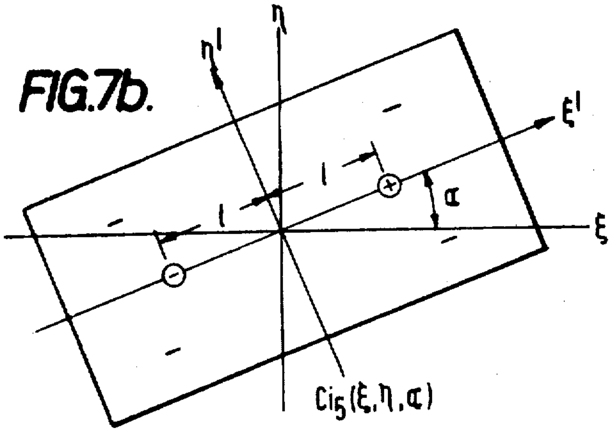

A next layer $U_5$ is for detecting an end of a line and consists of a plurality of unit layers each of which corresponds to each unit layer of the layer $U_4$ and interconnected thereto. In each unit layer of the layer $U_4$, it is necessary to distinguish the orientation of one end of each line of a given orientation detected by the layer $U_3$ from that of the other end of the same line. Thus, it is necessary to distinguish from a $\alpha + 180°$, so that the range of must be $0° \leq \alpha < 360°$ and the number of the elements is twice the number of the elements of the line component detecting layers $U_3$ and $U_4$. The interconnecting coefficient $C_{15}$ of such a unit layer of the end of line detecting layer $U_5$ is shown in FIGS. 7*a* and 7*b*. As illustrated in the drawing, the interconnecting coefficient $C_{15}$ has a positive pole at a point $(l, 0)$ and a negative pole at a point $(-l, 0)$ on a plane $(\xi', \eta')$ and has small negative value in a region other than these points. When an end of a line extending from the positive receptive field locates at a boundary between the positive and negative receptive fields, the positive receptive field is given by an excitatory input and produces an output therefrom, but the negative receptive field is in a quiescent condition and does not produce an output, so that the element produces a positive output. On the contrary, when a line extending over both of the receptive fields is given as an input pattern, an excitatory input and an inhibitory input are cancelled out with each other so that there is no output. When an end of a line extending from the negative receptive field locates at the boundary of these receptive fields, only an inhibitory input is given, so that the element does not produce an output. In this manner an end of a line can be detected.

Figure 8A:
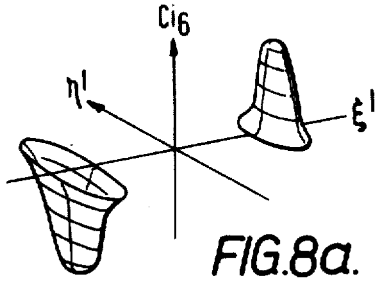
FIGS. 8*a* and 8*b* are diagrams showing a pattern of interconnecting coefficient of a curved portion detecting layer.
Figure 8B:
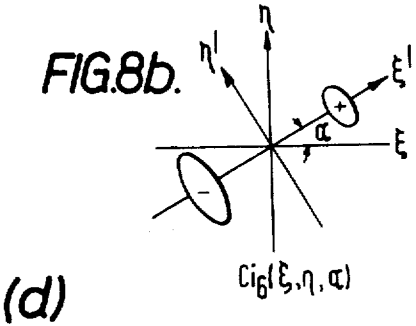

The layer $U_6$ is for detecting a curved portion or a folded portion in the input pattern. The layer $U_6$ consists of a number of unit layers each of which is interconnected to each unit layer consisting the layer $U_4$. Each unit layer of the layer $U_6$ has a two-dimensional array of a number of non-linear analog threshold elements. The unit layer having a certain orientation of $U_6$ is interconnected to the unit layer having the corresponding orientation of the line component detecting layer $U_4$. An interconnecting coefficient $C_{16}(x, y, \alpha)$ is shown in FIGS. 8*a* and 8*b*. In such a construction, each element of the layer $U_6$ is considered to be arranged three-dimensionally. An output $u_6(x, y, \alpha)$ from an element positioned at a point $(x, y, \alpha)$ may be expressed by the following equation;

$$u_6(x,y,\alpha)=\phi[\iint_{S_6} C_{16}(\xi,72,\alpha)\cdot U_4(x+\xi,y+\eta)d\xi,d\eta] \quad (8)$$

Figure 9:
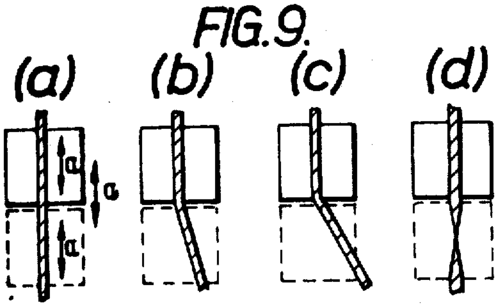
FIGS. 9*a* and 9*b* and FIG. 10 are diagrams explaining the detecting operation of a curved portion according to the system of the present invention.

Thus, an arbitrary element of $U_6$ receives antagonistic inputs from the elements of the line component detecting layer $U_4$ which are arranged in a direction $\alpha$ within a given region. That is, an element of the layer $U_6$ receives outputs from elements in the orientation $\alpha$ having a receptive field shown by a solid line in FIGS. 9*a*, 9*b*, 9*c* and 9*d* as excitatory inputs and outputs from elements in the orientation $\alpha$ having a receptive field shown by a dotted line as inhibitory inputs. As described above, an output from an element of the layer $U_3$ decreases when an orientation of stimulus of a line pattern shifts out of the largest response orientation. So, when an input pattern shown in FIG. 9*a* is given by the line component detecting layer, an inhibitory input overcomes an excitatory input, so that an output of the element becomes zero. When an input pattern illustrated in FIG. 9*b* is given, an orientation of the line component shifts somewhat from the greatest response orientation so that an inhibitory input decreases and it cannot overcome the excitatory input any more and an output will be produced. When an input pattern having a larger curvature as depicted in FIG. 9*c* is given, the inhibitory output further decreases, so that a larger output will be produced. In this manner, the layer $U_6$ supplies an output a magnitude of which depends on the curvature of an input curved line having an orientation of $\alpha$. In case of detecting a curved portion, it is necessary to distinguish an orientation $\alpha$ from an orientation $\alpha + 180°$, so that in the above equation (8), the range of the variable $\alpha$ must be $0° \leq \alpha < 360°$. That is, it is necessary to detect a curved line which locates on either the positive pole or the negative pole.

When an input straight line pattern which extends in a direction of the largest response is given within a receptive field of the elements of the layer $U_6$ and a width or a brightness of said straight line is not uniform, there will be a risk of producing a spurious output. Such a spurious output should be suppressed because the input pattern is not a curved line, but a straight line. In order to effect such a suppression of the spurious output, the negative pole of the interconnecting coefficient $C_{t6}(\xi,\iota,\alpha)$ has a volume larger than that of the positive pole and also has an absolute value greater than that of the positive pole as illustrated in FIG. 8. With such a characteristic of the interconnecting coefficient, the interconnection of the inhibitory inputs from the elements of the layer $U_4$ having the receptive field shown by the dotted line in FIGS. 9*a* to 9*d* is made stronger than the interconnection of the excitatory inputs from the elements of the layer $U_4$ having the receptive field shown by the solid line. Therefore, it does not respond to the input pattern depicted in FIG. 9*d* so that the layer $U_6$ does not produce a spurious output and it can detect only a curved portion.

Figure 10:
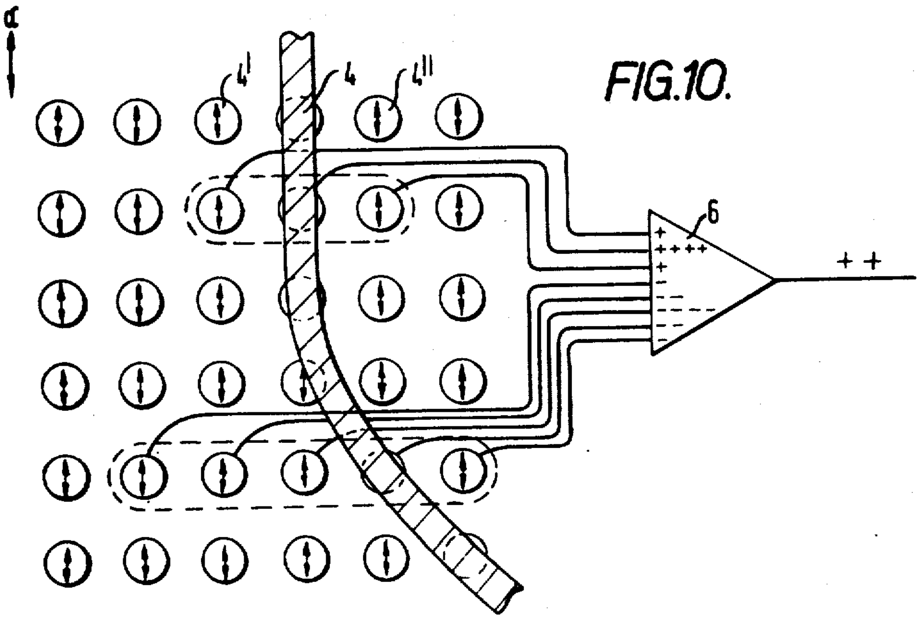

FIG. 10 shows diagrammatically the interconnection between an element 6 of the layer $U_6$ and a set of elements 4, 4', 4'', . . . of the layer $U_4$. As can be seen from the drawing, the interconnection of the inhibitory input has a wider area and a larger absolute value than those of the interconnection of the excitatory input. When a curved pattern is given, the excitatory input becomes larger than the inhibitory input and the element 6 produces an output. Thus, the curved portion can be detected and the detected output depends on a magnitude of the curvature.

Figure 11A:
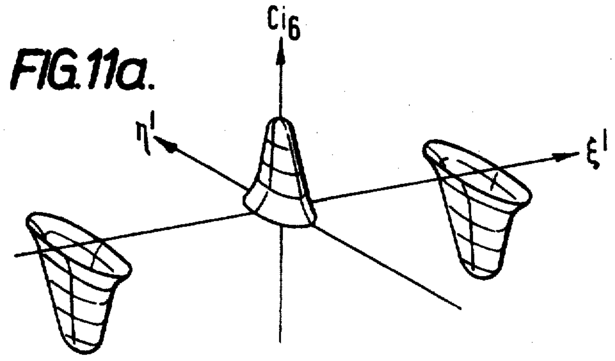
FIGS. 11*a* and 11*b* are diagrams showing a pattern of interconnecting coefficient of a curved portion detecting layer.
Figure 11B:
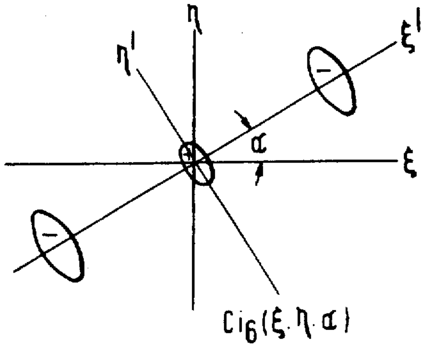
Figure 12:
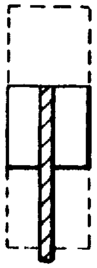
FIG. 12 is a diagram explaining the operation of the curved portion detecting layer.

With the interconnecting coefficient $C_{t6}$ having the positive and negative poles as shown in FIGS. 8*a* and 8*b*, there will be produced a spurious output in such a case that an end of an input line pattern locates at the middle of the inhibitory receptive field and the excitatory receptive field. FIGS. 11a and 11b show an example of an interconnecting coefficient $C'_{t6}$ which does not respond to such a straight line pattern, but responds only to a curved portion to produce an output. With such an interconnecting coefficient $C'_{t6}$, even when an end of a line locates at the boundary between the inhibitory receptive field shown by a dotted line in FIG. 12 and the excitatory receptive field shown by a solid line, an inhibitory input is still greater than an excitatory input so that the element 6 does not supply an output. As long as the end of the line locates within these receptive fields, the inhibitory input is always larger than the excitatory input so that the element 6 does not produce any output.

The last layer $U_7$ is for detecting a curvature and/or breakpoint and consists of a two-dimensional array of a number of non-linear analog threshold elements. This layer $U_7$ is commonly interconnected to each of the unit layers of the curved portion detecting layer $U_6$. An output $u_7(x, y)$ from an element positioned at a point $(x, y)$ on a plane co-ordinates may be expressed as;

$$u_7(x,y) = \phi\left[\int_0^{2\pi} U_6(x,y,\alpha)d\alpha\right] \quad (9)$$

Thus, when a curved pattern is given as an input pattern, the layer $U_7$ detects the degree of the curvature near the point $(x, y)$ independent from a direction $\alpha$ of tangent of the curved pattern and produces an output having a magnitude which depends on the degree of the curvature of the curve. That is, the elements 7, 7', 7'', . . . of the layer $U_7$ produces larger outputs, when the input pattern has a larger curvature (a smaller radius of curvature). This also applies to a breakpoint of the input pattern. So the layer $U_7$ can detect it to produce a larger output. When an angle of the breakpoint is larger, a magnitude of the output becomes correspondingly larger.

Figure 13:
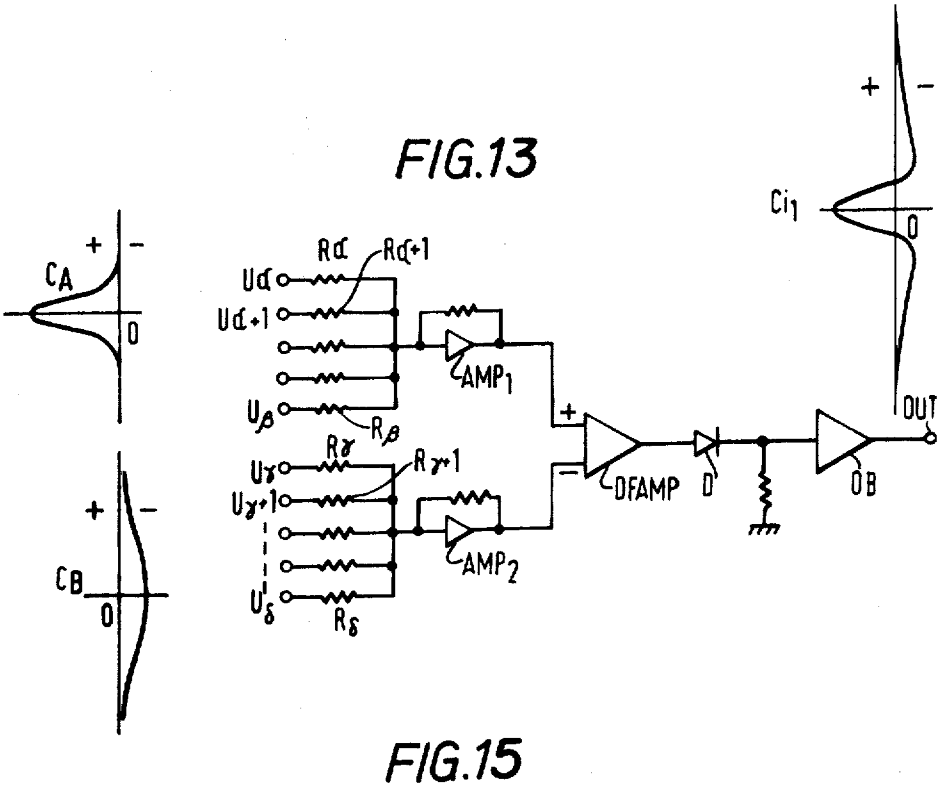
FIG. 13 shows an electric equivalent diagram of the practical embodiment of a non-linear type analog threshold element.

FIG. 13 shows an embodiment of a concrete construction of the abovementioned non-linear analog threshold element.

According to the invention, the non-linear analog threshold elements of each layer are interconnected to a preceding layer by means of the interconnecting coefficient circuits having the characteristics shown in FIGS. 3 to 8 and FIG. 11. In this case, elements in a certain region within the receptive field have to be interconnected with either a positive or negative polarity.

With reference to FIG. 13, the operation of the contrast component detecting layer $U_1$ will be explained by way of an example. In order to obtain the desired interconnection characteristic, there are provided with a positive interconnection characteristic $C_A$ corresponding to the photo excitatory interconnection and a negative interconnection characteristic $C_B$ corresponding to the inhibitory interconnection. By a combination of these interconnection characteristics $C_A$ and $C_B$, it is possible to obtain the desired interconnection characteristic $C_{t1}$ for detecting the contrast component. That is, among the photoreceptor elements 1, 1', 1'', . . . of the photoreceptor layer $U_o$ within the receptive field of the contrast component detecting layer $U_1$, each of photoreceptor elements $\underline{U_\alpha, U_{\alpha+1}, \ldots U_\beta}$ within a region of $C_A$ to be interconnected with a positive polarity is connected to an input terminal of an amplifier $AMP_1$ through each of resistors $\underline{R_\alpha, R_{\alpha+1}, \ldots R_\beta}$ each having a value related to the desired interconnecting coefficient and an output terminal of the amplifier $AMP_1$ is then connected to a positive input terminal of a differential amplifier DFAMP. Whereas, each of photoreceptor elements $\underline{U_\gamma, U_{\gamma+1}, \ldots U_\delta}$ within a region of $C_B$ to be connected with a negative polarity is connected to an input terminal of an amplifier $AMP_2$ through each of resistors $\underline{R_\gamma, R_{\gamma+1}, \ldots R_\delta}$ and an output terminal of the amplifier $AMP_2$ is connected to a negative input terminal of the differential amplifier DFAMP. In the present embodiment, since the interconnecting characteristic $C_i$; for detecting the contrast component as shown in FIGS. 3*a* and 3*b* is to be obtained, it is necessary to satisfy such a condition that $\alpha > \gamma$, $\beta < \delta$. That is to say, the number of elements interconnected to the negative input terminal must be larger than that interconnected to the positive input terminal. By suitably selecting values of the resistors $R_\alpha$, $R_{\alpha+1}$, . . . $R_\gamma$, $R_{\gamma+1}$, . . . , is possible to obtain any shapes of the positive and negative interconnecting characteristics $C_A$ and $C_B$.

To the output terminal of the differential amplifier DFAMP, a non-linear element of a diode D is connected. When an output of the differential amplifier DFAMP is positive, the diode D produces it as an output, but when the output of the differential amplifier DFAMP is negative, the diode D does not produce an output. The output of the diode D is passed through an output buffer OB to an output terminal OUT. An output of the non-linear analog threshold element can be derived from said output OUT.

Figure 14:
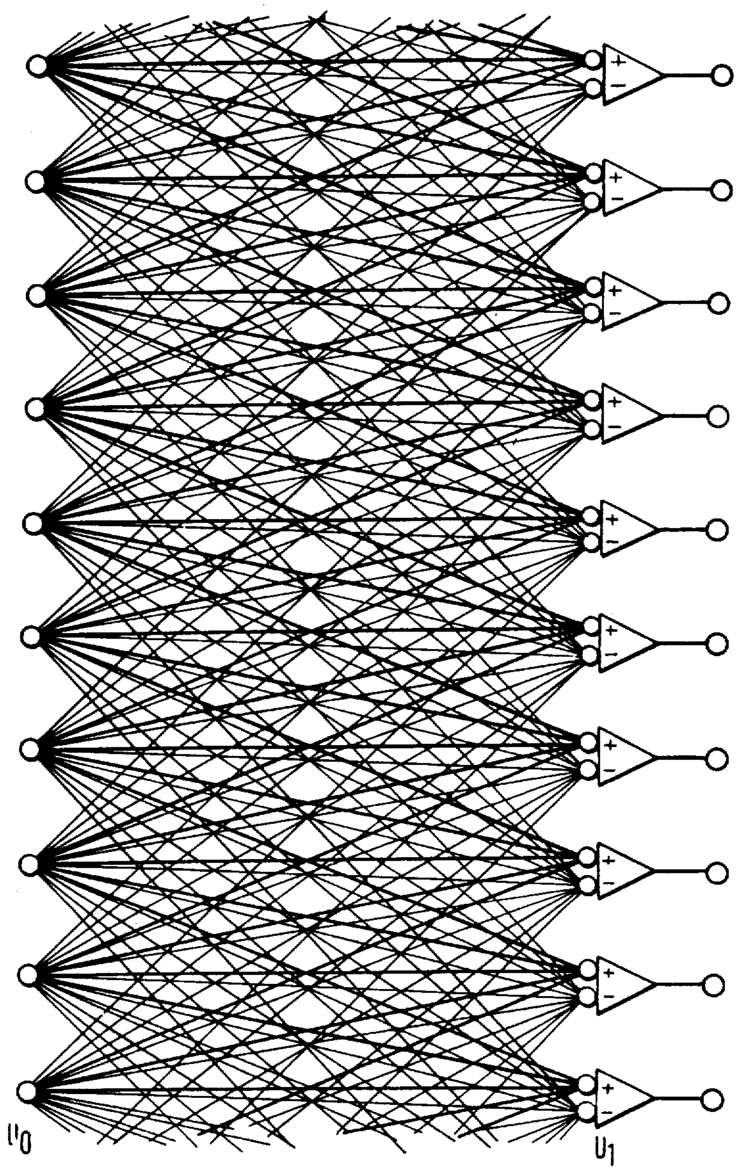
FIG. 14 is a simplified diagram showing interconnections between a photoreceptor layer and a contrast detecting layer.

According to the invention all layers except for the photoreceptor layer $U_o$ consist of a number of elements each having such a connection. Therefore, the number of connections becomes extremely large as diagrammatically illustrated in FIG. 14. As shown in the drawing, the positive input terminal of each analog threshold element of, for example, the contrast component detecting layer $U_1$ must be connected to a number of photoreceptor elements of the photoreceptor layer $U_o$ in accordance with specific interconnecting coefficients as shown by think lines and the negative input terminal must be connected to a larger number of photoreceptor elements in accordance with specific interconnecting coefficients as shown by thin lines. According to the invention, as previously explained with reference to FIG. 2, a plurality of layers are interconnected, so that the whole construction of the circuit arrangement of the visual feature extraction system becomes very complicated. However, the construction can be materially simplified by using an interconnecting network which will be explained hereinafter.

In such an interconnecting network according to the invention, two subsequent layers are interconnected in such a manner that each non-linear analog threshold element comprising the unit layer receives a signal from each element of the preceding layer within the receptive field through a common positive interconnection network and a common negative interconnection network, each of which networks is consisted of an impedance network.

Figure 15:
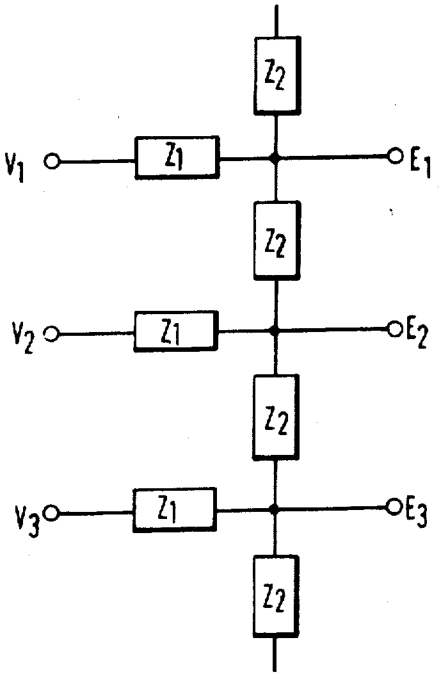
FIG. 15 is a circuit diagram showing a basic construction of an interconnecting coefficient network used for the interconnection between each of the layers of the system of the present invention.

In FIG. 15, $E_1$, $E_2$, $E_3$, . . . designate a set of terminals which are to be connected to positive or negative input terminals of the non-linear analog threshold elements of the succeeding layer; $V_1$, $V_2$, $V_3$, . . . denote a set of terminals which are to be connected to output terminals of the non-linear analog threshold elements of the preceding layer within the receptive field; and $Z_1$, $Z_2$, . . . show impedance elements. The terminals $E_1$, $E_2$, $E_3$, . . . are connected to input terminal of the amplifier $AMP_1$ or $AMP_2$ shown in FIG. 13 and the terminals $V_1$, $V_2$, $V_3$, . . . are connected to the terminals $U_\alpha$, $U_{\alpha+1}$, . . . $U_\beta$ or $U_\gamma$, $U_{\gamma+1}$, . . . $U_\delta$ shown in FIG. 14. With such a network, each of the terminals $E_1$, $E_2$, $E_3$, . . . are connected in the strongest manner to each of the terminals $V_1$, $V_2$, $V_3$, . . . which is opposed to each terminal $E_1$, $E_2$, $E_3$, . . . and the interconnection magnitude to the terminals which depart from said opposed terminal decreases exponentially. Thus, by suitably proportioning values of the impedance elements $Z_1$, $Z_2$, . . . , positive input signals to the non-linear analog threshold element can be obtained with a desired characteristic of the interconnecting coefficient. When the positive and negative interconnecting networks having such a construction are utilized, since the interconnecting coefficient circuit for each non-linear analog threshold element can be used commonly, the connecting network shown in FIG. 15 can be simplified to a great extent.

Figure 16:
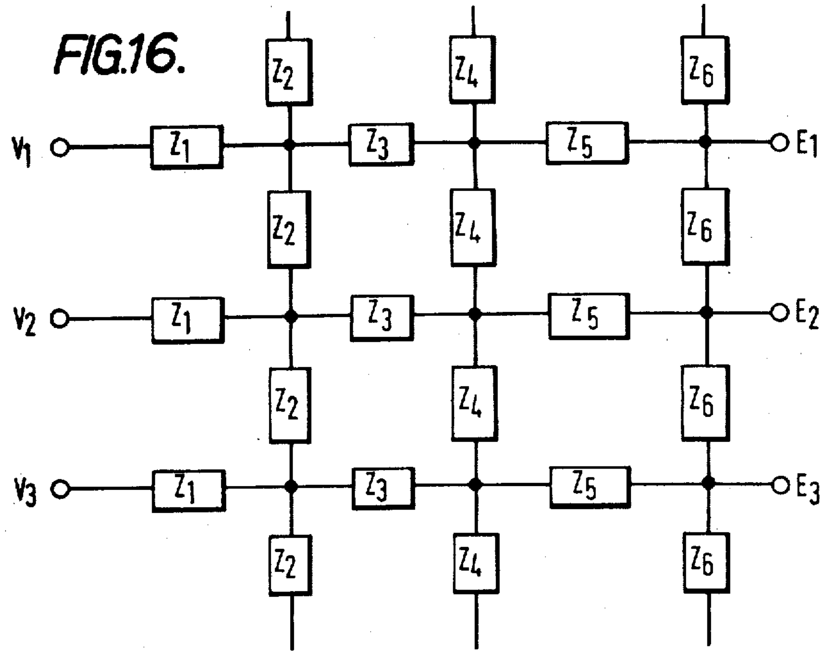
FIG. 16 is a circuit diagram of a modified embodiment of the interconnecting coefficient network.

FIG. 16 illustrates an embodiment of a positive interconnecting coefficient circuit consisting of a number of the basic interconnection circuit illustrated in FIG. 15. In the present embodiment, the positive pole does not have an exponentially steep slope, but has a somewhat round slope. In FIG. 16, parts corresponding to those of FIG. 15 are denoted by the same reference characters and $Z_1$, $Z_2$, $Z_3$, $Z_4$, $Z_5$, $Z_6$ show impedance elements of different values.

The above explained interconnection network can be advantageously used for interconnecting the detecting layers and any interconnecting coefficient circuit desired for each detecting layer can be simply obtained by suitably combining the impedance elements consisting the interconnecting network.

Figure 17:
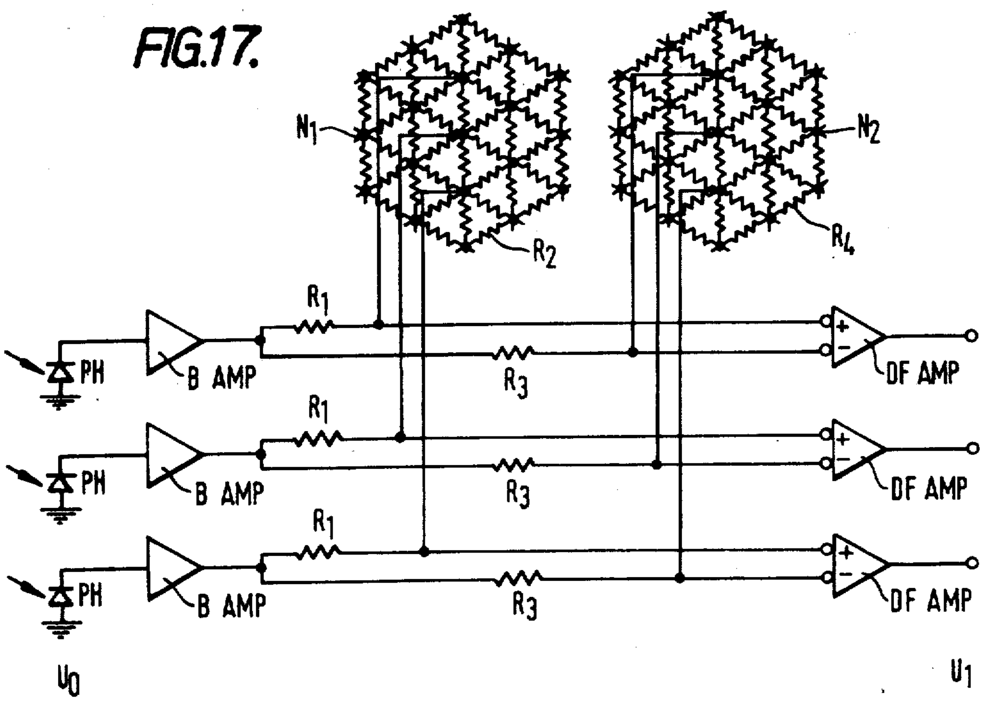
FIG. 17 is a circuit diagram of an embodiment of an interconnecting circuit used between a contrast detecting layer and photoreceptor layer having ON-CENTER type interconnecting characteristics.

FIG. 17 shows an embodiment of the interconnecting network having an ON-CENTER type interconnecting characteristic between the photoreceptor layer $U_o$ and the contrast component detecting layer $U_1$. Outputs of the photoreceptor elements PH are amplified in buffer amplifiers BAMP. Output terminals of the buffer amplifiers BAMP are connected to positive input terminals of differential amplifiers DFAMP through resistors $R_1$ and also connected to negative input terminals of the differential amplifiers DFAMP through resistors $R_3$. The positive input terminals of the adjacent differential amplifiers DFAMP are interconnected by means of a resistor $R_2$ and the negative input terminals of the adjacent differential amplifiers DFAMP are interconnected by means of a resistor $R_4$. A network consisted of the resistors $R_2$ is a positive interconnecting network $N_1$ and a network consisted of the resistor $R_4$ is a negative interconnecting network $N_2$. According to the present embodiment, a number of the resistors $R_2$ are connected to form triangles and each junction of the triangle connection is connected to a junction of each resistor $R_2$ and the positive input terminal of each differential amplifier DFAMP. In the negative interconnecting network $N_2$, the same connection is effected.

In the photoreceptor layer $U_o$, the photoreceptor elements PH are arranged two-dimensionally and also in the contrast component detecting layer $U_1$, the non-linear analog threshold elements are arranged two-dimensionally. Thus, when the positive input terminal of one differential amplifier DFAMP is considered, it is connected to an opposed photoreceptor element PH through one resistor $R_1$, to six adjacent photoreceptor elements through one resistor $R_2$ and one resistor $R_1$, to twelve adjacent photoreceptor elements through two resistors $R_2$ and one resistor $R_1$ and so on. This also applies to the negative interconnecting circuit. Therefore, by suitably selecting the values of the resistors $R_1$ to $R_4$, it is possible to obtain the positive and negative interconnecting characteristics $C_A$ and $C_B$ shown in FIG. 13. By a combination of these characteristics $C_A$ and $C_B$, the desired interconnecting characteristic $C_{t1}$ of ON-CENTER type for detecting the contrast components. In such positive and negative interconnecting networks, the resistors $R_2$ and $R_4$ are used commonly to interconnect a large number of input and output terminals, so that the number of these resistors $R_2$ and $R_4$ can be extremely reduced as compared with the interconnecting circuit shown in FIG. 13. Moreover, the number of conductors which interconnect the junctions of the resistors $R_2$, $R_4$ and input and output terminals can materially be reduced.

In the foregoing explanation, the combination circuits between respective layers are explained by taking an example of the contrast detecting layer; however, other combination circuits can be formed in the same configuration of network although the resistance value of the constructive elements should be altered. For instance, the triangular resistor networks $N_1$, $N_2$ shown in FIG. 17 may be used The apex of each of these triangular networks is a combination point of 6 resistors. If all the resistor branches originating from this apex are selected to be of the same value, the shape of the response surface of the preceding layer viewed from the apex becomes a circle. By selecting the degree of expanding of the response surfaces to be different in the networks of $N_1$ and $N_2$, the desired combination having the characteristic shown in FIG. 3 may easily be obtained, which will assume a combination characteristic between the photoreception layer and the contrast detection layer.

In the above figures, a comparatively weak negative polarity combination area is shown in a long rectangular shape, but this characteristic can be substituted by an ellipsoidal shape as shown by the contour line.

Moreover, the characteristics shown in FIGS. 11*a* and 11*b* may be formed by combining with a plurality of resistance networks to receive input of each element from three portions of previous layers by a characteristic as shown in the drawings.

The above mentioned combination may be realized by arranging each input terminal of a respective non-linear analog threshold element to be supplied with an input signal from the apex of the aforementioned triangular network having combination characteristics corresponding to the response area of the preceding layer to which the element is coupled, and by connecting the respective output terminal of each element in the preceding layer to the apex of the triangular network of the succeeding detection layer to which the element is to be connected.

In the aforementioned line component detecting layer, curved portion detecting layer and end of line detecting layer in which a plurality of detecting layers are coupled in parallel, the resistance network should be inserted separately between the preceding layers.

In such case, each of the plurality of layers forming a detection layer is anisotropic and the only difference is the direction of the anisotropy. Therefore the coupling to the preceding layer may be made by the same kind of resistance networks as explained above and have corresponding $x$ and $y$ axes.

When setting the sizes of the responsive areas, and the rate of positive and negative to be a shape as shown in FIG. 4*a*, then a combination characteristic of the dot detecting layer is obtained.

The combination characteristics of the simple type line detecting layer, complete type line detecting layer, end of line detecting layer and curved portion detecting layer as shown in FIGS. 5*a*, 6*a*, 7*a* and 8*a* are anisotropic.

A realization of such anisotropic combination can be made by selecting all the resistances of the resistors connected in a same direction in the triangular unit resistance networks to be of the same value and to be different polarity according to the direction.

By suitably selecting the ratio of the value of the resistance in each direction, a desired ellipsoidal characteristic may easily be obtained.

The characteristics shown in FIGS. 6*a* and 6*b* may be obtained by making the negative coupling zero.

The characteristics shown in FIGS. 8*a* and 8*b* have a minor difference for the response area of the preceding layer in the positive polarity combination and negative polarity combination and can easily be obtained by using the resistance networks explained before.

The combination characteristics shown in FIGS. 7*a* and 7*b*, may be obtained by additionally setting the value of the resistance elements to have ellipsoidal characteristics in the negative polarity combination networks shown in the FIGS. 8*a* and 8*b*.

By duplicating the triangular unit resistance networks, the shape of the spatial distribution of the coupling constant can be controlled to a great extent.

The duplicated or multiple networks needed to achieve this objective may have the shape of triangular resistance unit networks in a direction normal to the drawing in the uni-dimensional resistance network of FIG. 16. Namely, by taking the example of the illustrated embodiment, the element of series of three identical impedances $Z_2$, $Z_4$, $Z_6$ having the same impedance by unit triangular resistance networks. In this case each of the individual impedance element corresponds to one branch of the unit triangle network. Also, the degree of coupling of positive or negative polarity may be selected freely by controlling the gain of the differential amplifier in the non-linear analog threshold element.

As mentioned, the element of each layer constituting the present system of the invention corresponds to the element of the preceding layer.

Accordingly, the output of each element of the detection layer correspondingly to the location of each photo-receiving element, expresses the feature of a pattern projected on the photoreceptor layer. Such feature, corresponding to the portions of said projected pattern, may be memorized by a computer.

Namely, by giving a feature of a pattern, such as a new character into a computer, the class of layer may be distinguished by making a comparison with a feature, the class to which the layer belongs can be discriminated and a pattern discrimination becomes possible.

As described above in detail, according to the present invention, it is possible to extract the visual features of characters and patterns with the substantially same mechanism as the visual system of a living body. Moreover, by using the novel interconnecting network explained above, the circuit construction of the whole system can be simplified.

What is claimed is:

1. A visual feature extraction system comprising in combination at least a photoreceptor layer, a contrast detecting layer, a line component detecting layer, a curved portion detecting layer and a curvature detecting layer, wherein said photoreceptor layer consists of a two-dimensional array of a number of photosensitive elements, said contrast detecting layer consists of a two-dimensional array of a number of non-linear analog threshold elements and is interconnected to said photoreceptor layer in a cascade mode, said line component detecting layer is formed by a plurality of combined sets, each set of which is formed by a simple type line detecting layer and a complex type detecting layer connected thereto with a predetermined characteristic, each layer of each set having the same configuration as the contrast detecting layer, and when a surface of said line component detecting layer is expressed by orthogonal axes $\xi$ and $\eta$, said layers are interconnected in parallel with said contrast detecting layer with these axes being successively equi-angularly deviated about their center of the axes, said curved portion detecting layer consists of a plurality of layers each of which has the same structure as that of said contrast detecting layer and is interconnected to said line component detecting in a cascade mode, and said curvature detecting layer consists of a layer having the same structure as that of said contrast detecting layer and is interconnected in parallel with said curved portion detecting layer so as to receive an output from each of a plurality of layers of said curved portion detecting layer in a parallel mode, whereby the interconnecting characteristics between said layers are determined in accordance with the desired detecting purposes.

2. A visual feature extraction system as claimed in claim 1, wherein said non-linear analog threshold element forming each of the layers is so constructed to receive outputs from a set of elements within a certain region of receptive field of a preceding layer through an interconnecting coefficient circuit having a characteristic in accordance with a desired detecting purpose and to produce an output corresponding to a value exceeding a given threshold value of a signal of an algebraic sum of said outputs, only when said algebraic sum is positive.

3. A visual feature extraction system as claimed in claim 2, wherein a receptive field of each of said non-linear analog threshold elements of each of said contrast detecting layer, said line component detecting layer and said curvature detecting layer is so constructed to be overlapped viewed from the photoreceptive surface of said photoreceptor layer to cover whole of said photoreceptive surface and a receptive field of each of the non-linear analog threshold elements of said curved portion detecting layer corresponds to adjacent two to three portions in the direction of a line component detected by the preceding line component detecting layer and is interconnected antagonistically to said portions.

4. A visual feature extraction system as claimed in claim 3, wherein said non-linear analog threshold element of said curvature detecting layer is so interconnected in parallel with a plurality of layers consisting said curved portion detecting layer as to receive in a summation mode a set of outputs from receptive fields which correspond to the same position on said photoreceptor layer.

* * * * *